United States Patent
Kim et al.

(10) Patent No.: US 11,784,142 B1
(45) Date of Patent: Oct. 10, 2023

(54) HIGHLY RELIABLE PHYSICALLY UNCLONABLE FUNCTION

(71) Applicant: Inha University Research and Business Foundation, Incheon (KR)

(72) Inventors: Hyungjin Kim, Incheon (KR); Jinwoo Park, Incheon (KR)

(73) Assignee: Inha University Research and Business Foundation, Incheon (KR)

( * ) Notice: Subject to any disclaimer, the term of this patent is extended or adjusted under 35 U.S.C. 154(b) by 0 days.

(21) Appl. No.: 18/303,447

(22) Filed: Apr. 19, 2023

(30) Foreign Application Priority Data

Jun. 9, 2022 (KR) .................. 10 2022 0070009

(51) Int. Cl.
G06F 21/75 (2013.01)
H04L 9/32 (2006.01)
G11C 5/00 (2006.01)
H01L 23/00 (2006.01)
G11C 13/00 (2006.01)

(52) U.S. Cl.
CPC ............ H01L 23/573 (2013.01); G06F 21/75 (2013.01); G11C 13/0059 (2013.01); H04L 9/3278 (2013.01)

(58) Field of Classification Search
CPC ... H01L 23/573; G06F 21/75; G11C 13/0059; H04L 9/3278
USPC ........................................................ 713/189
See application file for complete search history.

(56) References Cited

U.S. PATENT DOCUMENTS

| | | | | |
|---|---|---|---|---|
| 11,329,836 B1* | 5/2022 | Kirihata | .............. | G11C 8/10 |
| 2015/0278551 A1* | 10/2015 | Lee | .............. | G06Q 30/0273 |
| | | | | 705/14.44 |
| 2016/0065379 A1* | 3/2016 | Holcomb | .............. | G09C 1/00 |
| | | | | 713/189 |
| 2017/0017808 A1* | 1/2017 | Kwong | .............. | H04L 9/3278 |
| 2017/0038807 A1* | 2/2017 | Bittlestone | .............. | G06F 21/73 |
| 2018/0316493 A1* | 11/2018 | Kvatinsky | .............. | H04L 9/3242 |
| 2021/0314176 A1* | 10/2021 | Cambou | .............. | H04L 9/0866 |
| 2023/0188337 A1* | 6/2023 | Bert | .............. | G06F 3/0659 |
| | | | | 713/171 |
| 2023/0188366 A1* | 6/2023 | Steinmetz | .............. | H04L 9/30 |
| | | | | 713/176 |

FOREIGN PATENT DOCUMENTS

KR  10-2020-0075722   6/2020

OTHER PUBLICATIONS

Kim, "Implementation of Non-lnvasive Physical Unclonable Function Based on a Memristor Crossbar Array," Department of Electrical Engineering Dayoung Kim, Masters Thesis (Dec. 2021), 92 pages.

(Continued)

*Primary Examiner* — Dereena T Cattungal
(74) *Attorney, Agent, or Firm* — Christensen O'Connor Johnson Kindness PLLC

(57) ABSTRACT

Disclosed is a highly reliable physically unclonable function technology. In a tunneling-based memory device disclosed herein, a conductive layer (e.g., $Al_2O_3$) is stacked on a bottom electrode, an oxide layer (e.g., TiOx) is stacked on the conductive layer, and a top electrode is stacked on the oxide layer. The tunneling-based memory device has a structure of a memristor crossbar array and has a current-voltage characteristic independent of a temperature that is an external environmental variable due to a tunneling mechanism when constructing an unpredictable physically unclonable function (PUF) of hardware as a memory semiconductor array.

5 Claims, 11 Drawing Sheets

(56) References Cited

OTHER PUBLICATIONS

Opinion Submission Notice for Appln. No. 10-2022-0070009, dated Sep. 6, 2022, 12 pages.

* cited by examiner

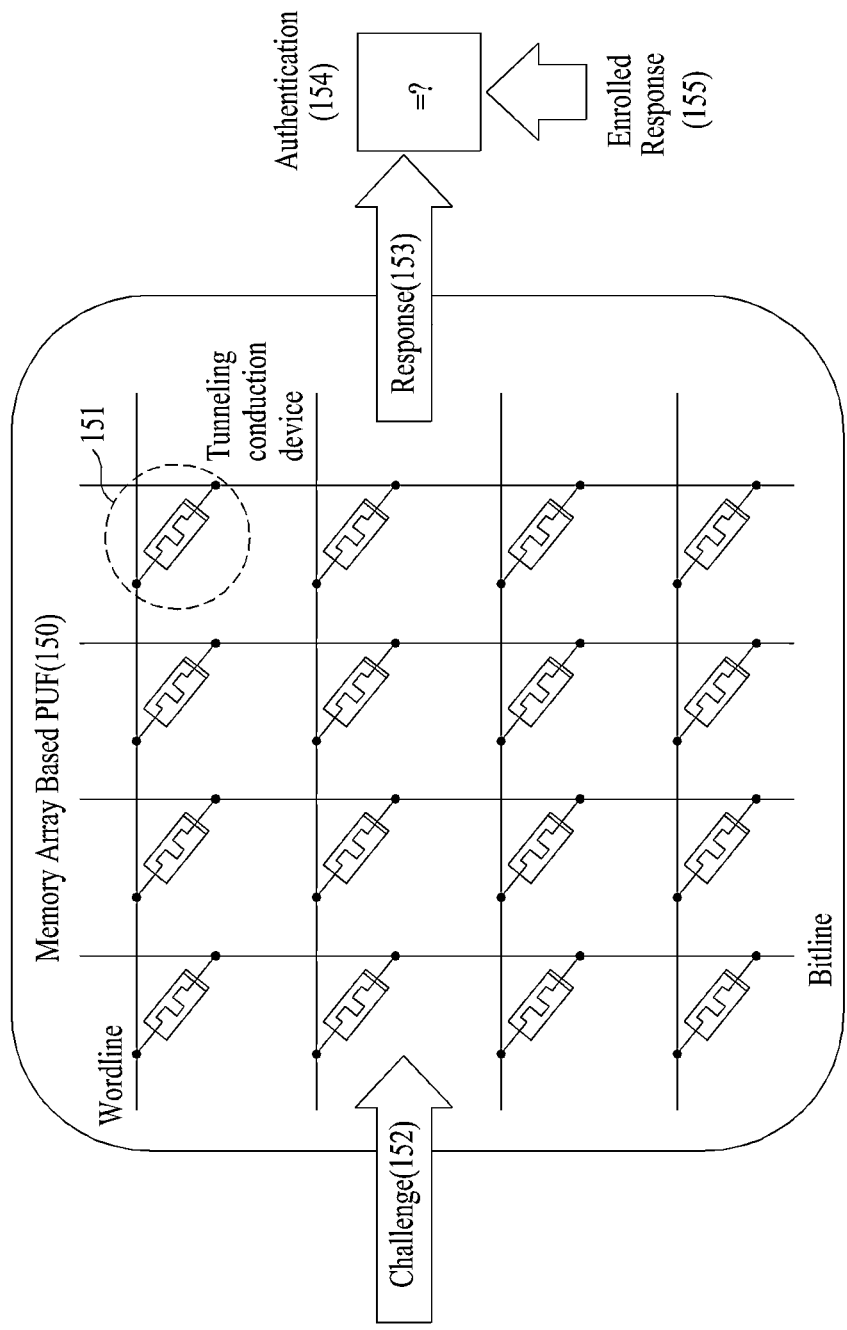

HIGHLY RELIABLE PHYSICALLY UNCLONABLE FUNCTION

CROSS-REFERENCE TO RELATED APPLICATION

This application claims the priority benefit of Korean Patent Application No. 10-2022-0070009, filed on Jun. 9, 2022, in the Korean Intellectual Property Office, the disclosure of which is incorporated herein by reference.

BACKGROUND

1. Field of the Invention

The following description of example embodiments relates to a highly reliable physically unclonable method and a memory array.

2. Description of the Related Art

As smartphones become popular, information is interconnected due to the ubiquitous trend and accordingly, encryption is mostly performed through a software security method in security and authentication fields of processing sensitive information and tasks. However, according to the spread of an Internet of things (IoT) environment, the risk of hacking also increases, which causes many security accidents, such as a leakage of personal information. Therefore, there is an increasing demand for safer security.

To make data stored in a server unpredictable through artificial intelligence such as deep learning and machine learning, research on a physically unclonable function (PUF) that uses a hardwarely unpredictable manufacturing process deviation and an intrinsic characteristic is being actively conducted. In particular, research on a PUF that uses a memory semiconductor array is being actively conducted due to its high degree of integration and rewrite possibility of a security key.

A key operating principle of a memory array-based PUF is that all the voltage-current characteristics of a memory device have different values due to an inter-element dispersion and a process dispersion and a current size relationship with an adjacent memory device is unpredictable. However, if a current-voltage relationship of the memory device is greatly affected by temperature, the current size relationship may be reversed and an error may occur in a security authentication process accordingly. This error is usually referred to as a bit-error rate (BER) and, ideally, the BER needs to be 0 for a highly reliable PUF operation. The present invention proposes a PUF technology that is implemented as a tunneling-based memory device and array having a current-voltage characteristic independent of temperature to implement a PUF with a BER operation close to 0.

A related reference material includes Korean Patent Laid-Open Publication NO. 10-2020-0075722 (published on Aug. 20, 2021).

SUMMARY

Example embodiments may provide a highly reliable physically unclonable technology based on a tunneling-based memory semiconductor array that may significantly reduce an error for a bit-error rate (BER) of elements in which a conduction mechanism of free carriers is affected by temperature as well as an active element such as diode and a transistor vulnerable to temperature that is a variable external environmental factor and may ensure a highly reliable operation with a parallel operation of a memory array.

According to an aspect, there is provided a tunneling-based memory device. Here, a conductive layer (e.g., $Al_2O_3$) is stacked on a bottom electrode, an oxide layer (e.g., TiOx) is stacked on the conductive layer, and a top electrode is stacked on the oxide layer, and the tunneling-based memory device has a structure of a memristor crossbar array and has a current-voltage characteristic independent of a temperature that is an external environmental variable due to a tunneling mechanism when constructing an unpredictable physically unclonable function (PUF) of hardware as a memory semiconductor array.

The tunneling-based memory device has a stack structure of operating with a tunneling-based conduction mechanism by adjusting a thickness of the conductive layer.

The tunneling-based memory device having the structure of the memristor crossbar array has the current-voltage characteristic independent of the temperature and reduces a bit-error rate (BER) that prevents an error from occurring in a security authentication process for the PUF.

According to another aspect, there is provided a physically unclonable method including applying a challenge to construct a PUF using a tunneling-based memory device having a structure of a memristor crossbar array; extracting a response according to a voltage-current characteristic using the applied challenge; and performing authentication through verification between an enrolled response and the extracted response.

The tunneling-based memory device having the structure of the memristor crossbar array has the structure of the memristor crossbar array and has the current-voltage characteristic independent of a temperature that is an external environmental variable due to a tunneling mechanism when constructing an unpredictable PUF of hardware as a memory semiconductor array and reduces a BER that prevents an error from occurring in a security authentication process for the PUF.

The applying of the challenge to construct the PUF using the tunneling-based memory device having the structure of the memristor crossbar array includes allowing current to flow in each bitline through conductivity of a memristor device and a vector and matrix multiplication operation by applying a voltage corresponding to a digital signal of the challenge to each wordline of the memristor crossbar array to form a challenge-response pair, and adding up current flowing in half bitlines selected from among all bitlines and adding up current flowing in unselected half bitlines and thereby storing the current in different registers, respectively.

The extracting of the response according to the voltage-current characteristic using the applied challenge includes connecting an unselected wordline and an unselected bitline to floating or ground, and connecting remaining selected bitlines to a bitline or ground when adding up current flowing in the unselected half bitlines, and the current stored in each of different registers is converted to voltage and a size comparison is performed through a comparator to generate a 1-bit response of 0 or 1.

The performing of the authentication through verification between the enrolled response and the extracted response includes determining the voltage-current characteristic according to a driving principle of a memory semiconductor device and implementing a security function by using, as a unique response, a feature that a different amount of current flows regardless of the same voltage being applied due to a manufacturing process deviation and an inter-element deviation.

When performing a PUF with a tunneling-based memory semiconductor array according to example embodiments, it is possible to significantly reduce an error of a BER of elements in which a conduction mechanism of free carriers is affected by temperature as well as an active element such as diode and a transistor vulnerable to temperature that is a variable external environmental factor and to ensure a highly reliable operation with a parallel operation of a memory array.

According to example embodiments, when configuring an unpredictable hardware PUF as a memory semiconductor array, it is possible to apply as a stable operation in an encryption key generation or authentication for which a PUF may be used by improving the reliability capable of having a characteristic robust against temperature that is an external environmental variable due to a tunneling mechanism, which differs from software-based methods that are widely used as a security method.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which:

FIGS. 1A and 1B illustrate a structure of a tunneling-based memory device and a physically unclonable function (PUF) based on a tunneling-based memory array for a highly reliable physically unclonable aspect according to an example embodiment;

DETAILED DESCRIPTION

Figure 1A:
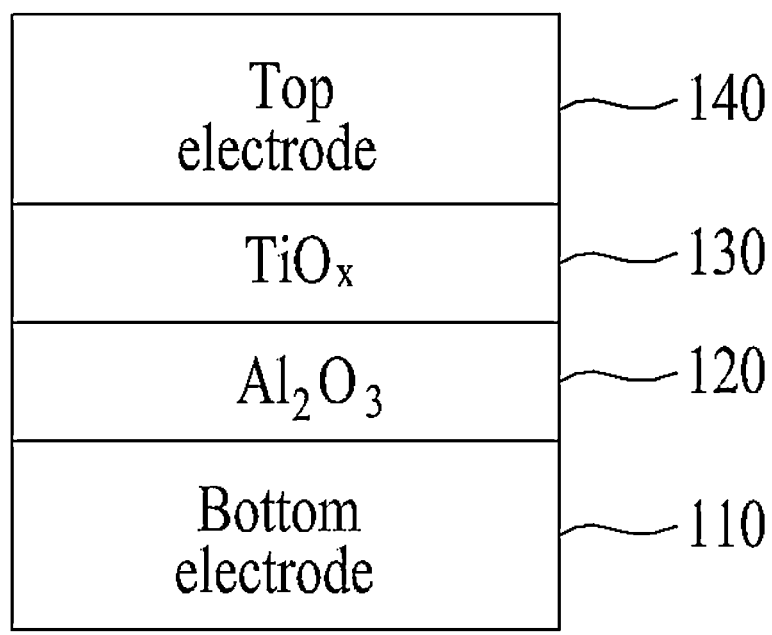

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a," "an," and "the" are intended to include the plural forms as well, unless the context clearly indicates otherwise.

It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Example embodiments propose physically unclonable function (PUF) technology that is highly reliable hardware-based security technology capable of extracting a very stable challenge (i.e., input)-response (i.e., output) using tunneling as a dominant conduction mechanism. In general, a PUF manufactured as hardware performs an operation in which input/output characteristics are reversed due to an external environment such as temperature. In particular, in the case of using a memory semiconductor array, input/output characteristics may be reversed due to a temperature characteristic of a corresponding memory device, which is fatal for a PUF operation that needs to provide a constant challenge-response pair at all times regardless of an external environment. This may be prevented in the case of using a tunneling phenomenon of which an operating characteristic is insensitive to temperature. A current-voltage characteristic of tunneling is determined depending on a tunneling distance and an involvement degree of temperature is very small. Therefore, when a memory device is driven based on this, a challenge-response characteristic of a PUF configured as above is extremely little affected by an external environment and a stable security input/output characteristic may be acquired. Hereinafter, the example embodiments will be described with reference to the accompanying drawings.

FIGS. 1A and 1B illustrate a structure of a tunneling-based memory device and a PUF based on a tunneling-based memory array for a highly reliable physically unclonable aspect according to an example embodiment.

In detail, FIG. 1A illustrates a structure of a tunneling-based memory device for a highly reliable physically unclonable aspect according to an example embodiment, and FIG. 1B illustrates a PUF based on a tunneling-based memory array for a highly reliable physically unclonable aspect according to an example embodiment.

A key operating principle of a memory array-based PUF is that all the voltage-current characteristics of a memory device have different values due to an inter-element dispersion and a process dispersion and a current size relationship with an adjacent memory device is unpredictable. However, if a current-voltage relationship of the memory device is greatly affected by temperature, the current size relationship may be reversed and an error may occur in a security authentication process accordingly. This error is usually referred to as a bit-error rate (BER) and, ideally, the BER needs to be 0 for a highly reliable PUF operation.

The example embodiments propose a PUF technology that is implemented as a tunneling-based memory device and array having a current-voltage characteristic independent of temperature to implement a PUF with a BER operation close to 0.

Referring to FIG. 1A, a tunneling-based memory device according to an example embodiment is implemented as a memristor crossbar array including a conductive layer (e.g., $Al_2O_3$) 120 and an oxide layer (e.g., TiOx) 130 stacked on a bottom electrode 110, and a top electrode 140, and is also implemented in a stack structure in which tunneling operates as a dominant conduction mechanism by adjusting a thickness of the conductive layer 120. Although the example embodiment is described by using $Al_2O_3$ and TiOx as examples of the conductive layer 120 and the oxide layer 130, respectively, the example embodiment is not limited thereto. In addition thereto, various materials that enable a PUF operation using a tunneling mechanism may be used.

A tunneling-based memory device according to an example embodiment may have a current-voltage characteristic independent from a temperature that is an external environmental variable due to a tunneling mechanism between the conductive layer 120 and the oxide layer 130 when configuring an unpredictable PUF of hardware as a memory semiconductor array.

A tunneling-based memory device according to an example embodiment is not limited to a memristor device and may be applied to other semiconductor devices and arrays that use tunneling as a major mechanism.

Hereinafter, a memory array-based PUF 150 using tunneling-based memory devices 151 for highly reliable physically unclonable aspect is described with reference to FIG. 1B.

Referring to FIG. 1B, a memory semiconductor array-based PUF may implement a security function through application of a challenge 152, extraction of a response 153, and verification with an enrolled response 155. Various methods of challenging a response and extracting a response with respect to a PUF may be employed. In general, the methods may be performed in a form of applying voltage at a random location and then comparing flowing current. A voltage-current characteristic is determined according to a driving principle of a memory conductor device. Although the same voltage is applied due to a manufacturing process dispersion and an inter-element dispersion, a different amount of current flows and a security function is implemented by using the same as a unique response.

Herein, the term "response" may implement a reliable security authentication procedure when it is not changed due to an external environment. In general conduction mechanisms of a memory conductor device, such as diffusion, drift, pool Frenkel conduction, Schottky conduction, and the like, current varies (generally, increases) according to an increase in temperature, which makes it difficult to maintain unique output and becomes a major cause of a BER.

The example embodiments propose technology for configuring a highly reliable challenge-response pair with little change in an output characteristic of a PUF although a temperature changes when configuring the PUF using a memory device that uses tunneling significantly lower sensitive to temperature than other conduction mechanisms.

Figure 2:
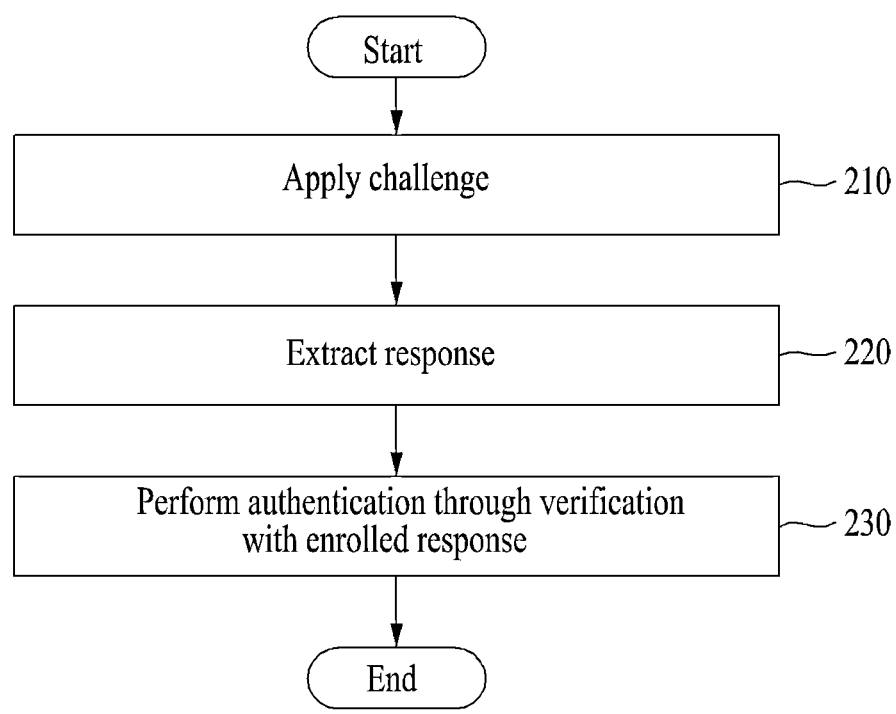
FIG. 2 is a flowchart illustrating a highly reliable physically unclonable method according to an example embodiment.

FIG. 2 is a flowchart illustrating a highly reliable physically unclonable method according to an example embodiment.

A highly reliable physically unclonable method for a tunneling-based memory device having a structure of a memristor crossbar array includes operation 210 of applying a challenge to construct a PUF using the tunneling-based memory device having the structure of the memristor crossbar array, operation 220 of extracting a response according to a voltage-current characteristic using the applied challenge, and operation 230 of performing authentication through verification between an enrolled response and the extracted response.

As described above with reference to FIGS. 1A and 1B, the tunneling-based memory device having the structure of the memristor crossbar array may have the structure of the memristor crossbar array and may have a current-voltage characteristic independent of a temperature that is an external environmental variable due to a tunneling mechanism when constructing an unpredictable PUF of hardware as a memory semiconductor array and may reduce a BER that prevents an error from occurring in a security authentication process for the PUF.

In operation 210, the challenge to construct the PUF is applied using the tunneling-based memory device having the structure of the memristor crossbar array.

According to an example embodiment, to form a challenge-response pair, current is allowed to flow in each bitline through conductivity of a memristor device and a vector and matrix multiplication operation by applying a voltage corresponding to a digital signal of the challenge to each wordline of the memristor crossbar array and current flowing in half bitlines selected from among all bitlines is added up and current flowing in unselected half bitlines is added up and thereby stored in different registers, respectively.

In operation 220, the response according to the voltage-current characteristic is extracted using the applied challenge.

According to an example embodiment, an unselected wordline and an unselected bitline are connected to floating or ground, and when adding up current flowing in unselected half bitlines, remaining selected bitlines are connected to a bitline or ground. Current stored in each of different registers is converted to voltage and a size comparison is determined through a comparator and then a 1-bit response of 0 or 1 is generated.

In operation 230, the authentication is performed through verification between the enrolled response and the extracted response.

According to an example embodiment, the voltage-current characteristic may be determined according to a driving principle of a memory conductor device. Although the same voltage is applied due to a manufacturing process dispersion and an inter-element dispersion, a security function may be implemented by using, as a unique response, a feature that a different amount of current may flow.

FIGS. 3A, 3B, 3C, and 3D illustrate a temperature characteristic of a memristor crossbar array element according to an example embodiment.

Figure 3A:
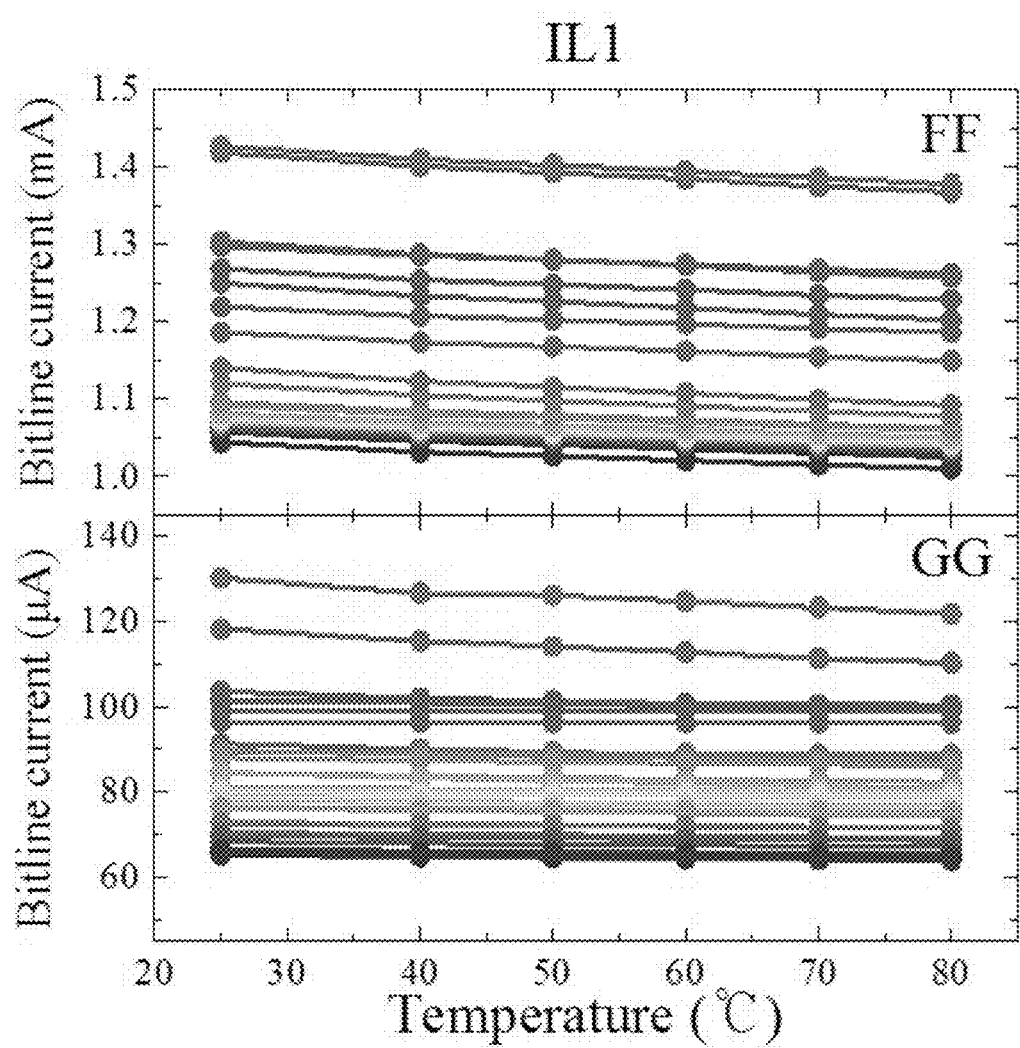
FIGS. 3A, 3B, 3C, and 3D illustrate a temperature characteristic of a memristor crossbar array element according to an example embodiment.

For an element of a memristor crossbar array according to an example embodiment, a total of four conditions were verified according to the number of cycles during $Al_2O_3$ deposition through atomic layer deposition (ALD) and sputtering $O_2$ flow rate during TiOx deposition. The effect of the present invention was verified by analyzing current change trends according to a change in temperature of an insulator layer 1 (IL1) element that includes a switching layer with a most metallic conductive characteristic and an oxygen storage (FIG. 3A), an IL4 element that includes a switching layer with a most non-conductive characteristic of an insulator and an oxygen storage (FIG. 3D), and an IL2 element (FIG. 3B) and an IL3 element (FIG. 3C) having a dominant tunneling mechanism between them according to a reading method. Referring to FIG. 3A, the IL1 element was measured as 10 cycles 0.6 sccm, referring to FIG. 3B, the IL2 element was measured as 10 cycles 0.8 sccm, referring to FIG. 3C, the IL3 element was measured as 14 cycles 0.8 sccm, and referring to FIG. 3D, the IL4 element was measured as 17 cycles 1.2 sccm.

Figure 3B:
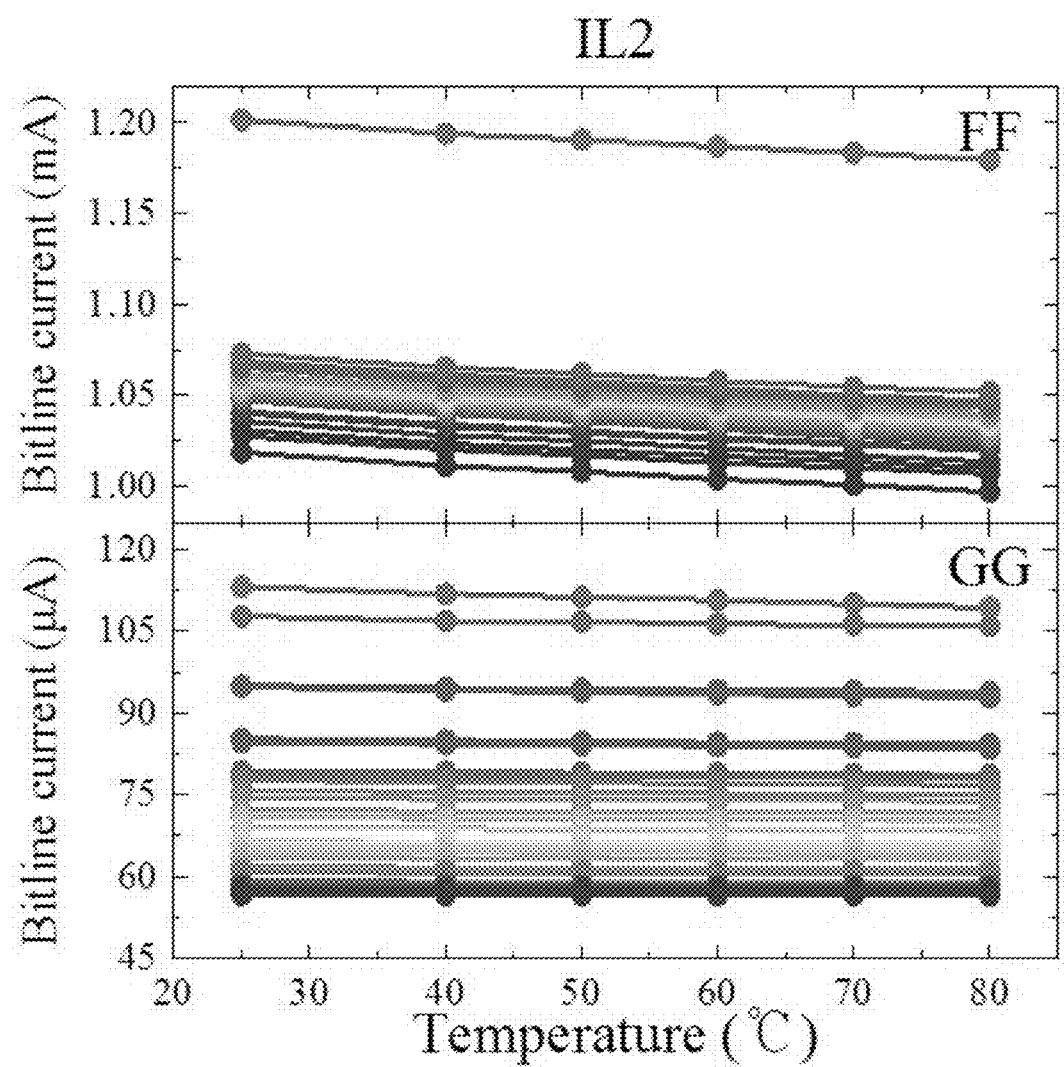
Figure 3C:
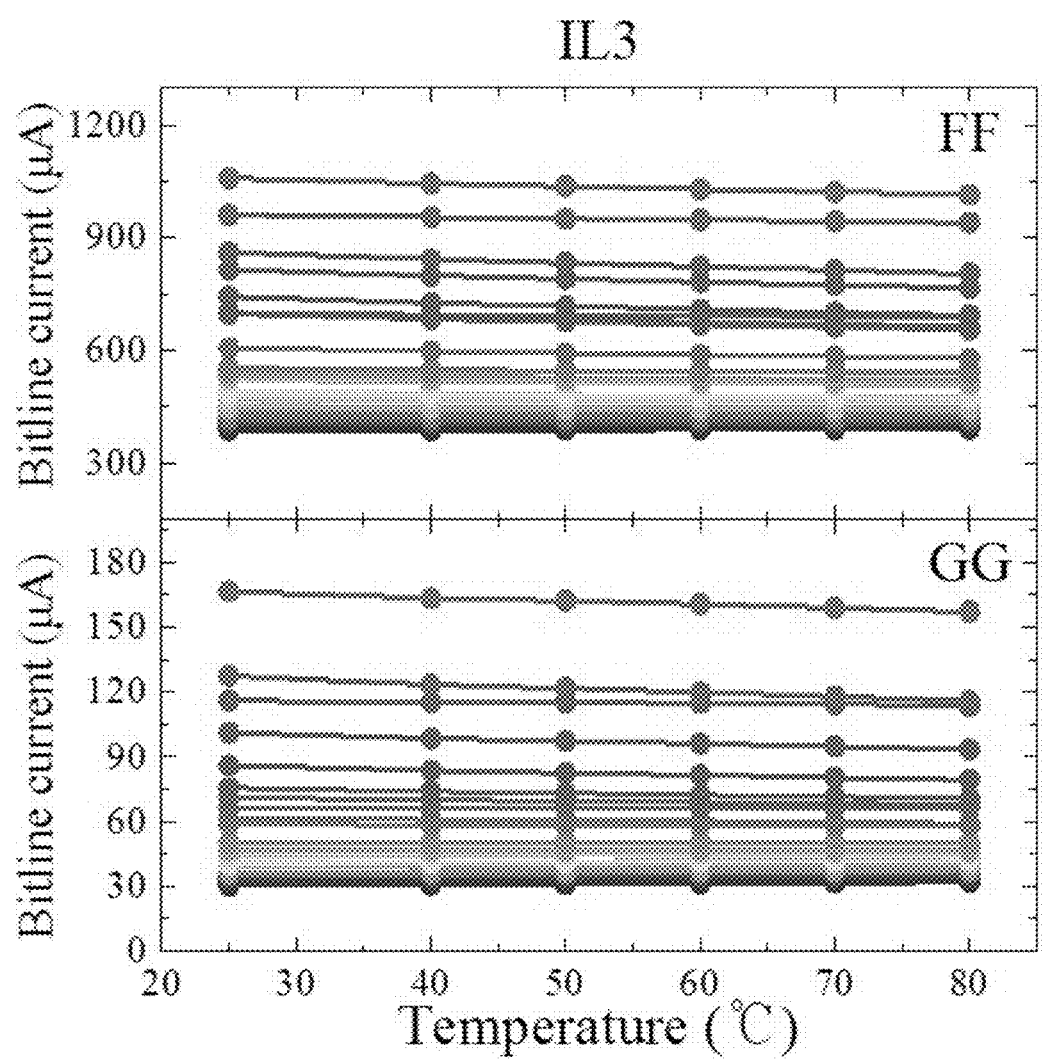
Figure 3D:
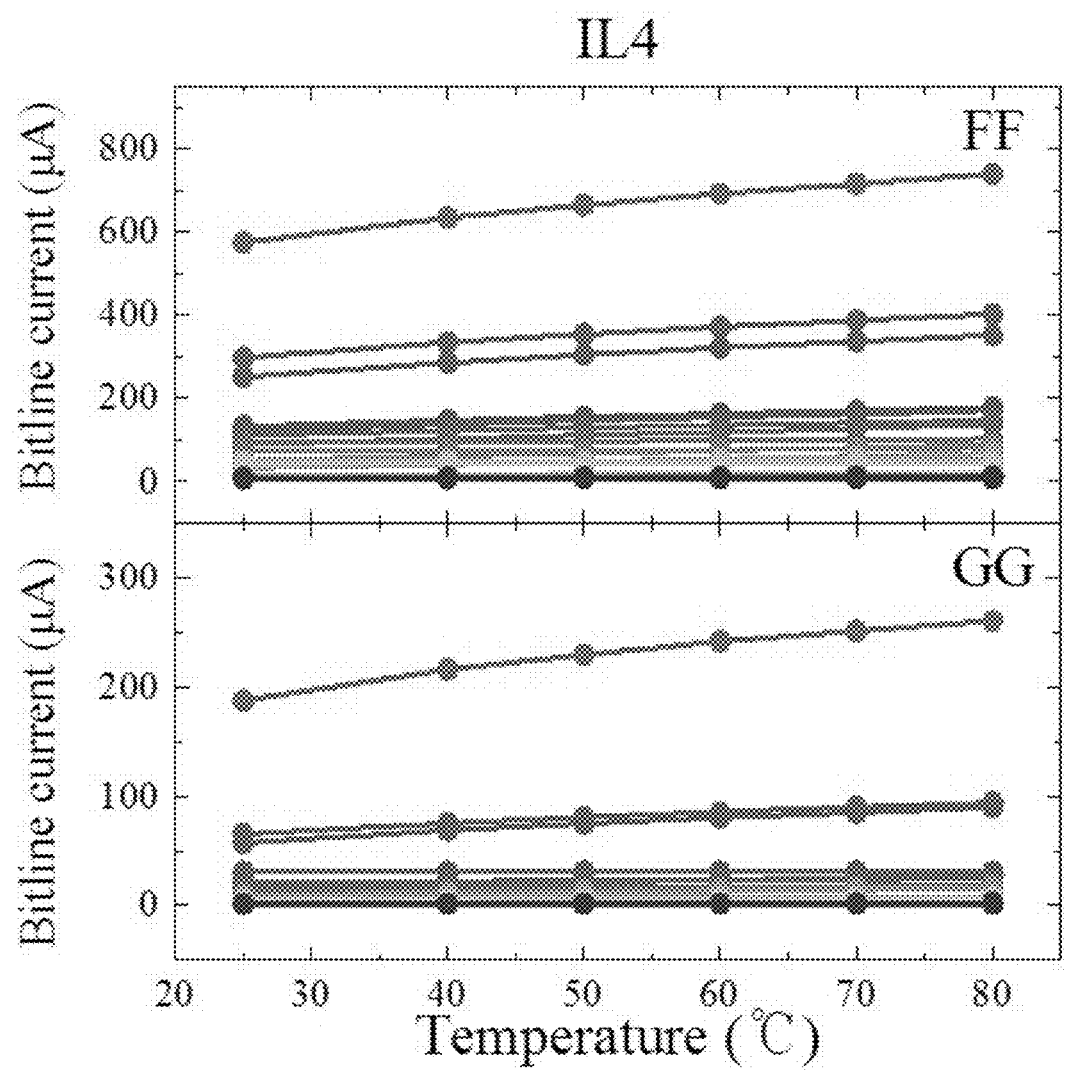

When temperature increases, current flowing in a bitline decreases in a conductive element as shown in FIG. 3A and current flowing in a bitline decreases in a nonconductive element. The characteristic that current changes due to temperature may lead to an error of an output characteristic, which obstructs a stable security operation characteristic. On the contrary, as shown in FIGS. 3B and 3C, since a floating-floating (FF) reading method has a larger amount of sneak current generated from a crossbar array compared to a ground-ground (GG) reading method, two elements in which the tunneling mechanism is dominant barely show change in current over a change in temperature although there is a slight change. Through this, the tunneling-based memristor device allows nearly constant current to flow regardless of the change in temperature, enabling a stable challenge-response operation, which leads to a low BER of a PUF.

FIGS. 4A, 4B, 4C, and 4D illustrate a characteristic of a tunneling-based memristor crossbar array element.

Figure 4A:
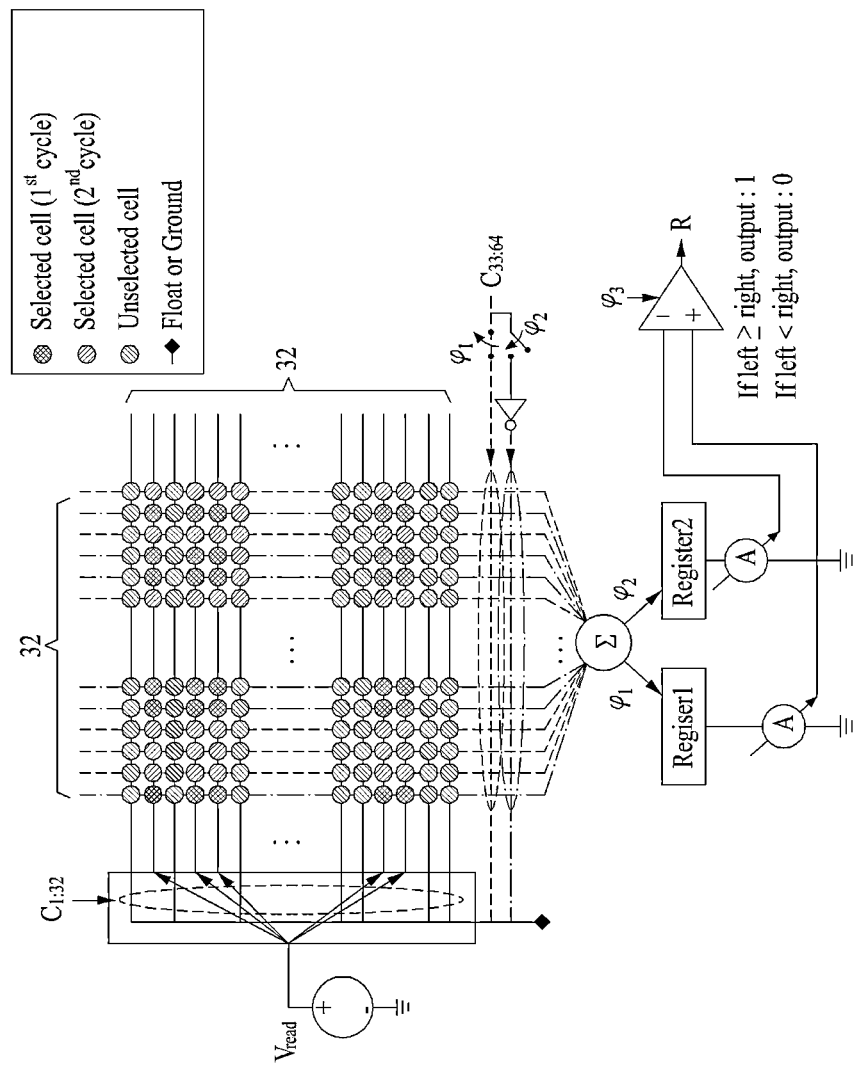
FIGS. 4A, 4B, 4C, and 4D illustrate a characteristic of a tunneling-based memristor crossbar array element according to an example embodiment.

After constructing a system as shown in FIG. 4A using a tunneling-based memristor crossbar array according to an example embodiment, challenge-response was verified. A method of FIG. 4A is provided as an example embodiment and the present invention is not limited thereto.

To form a challenge-response pair according to an example embodiment, current flows in each bitline through conductivity of a memristor device and a vector and matrix multiplication operation by applying a voltage corresponding to a digital signal of a challenge to each wordline and current flowing in half bitlines selected from among all bitlines is added up and current flowing in unselected half bitlines is added up and thereby stored in different registers, respectively.

Figure 4B:
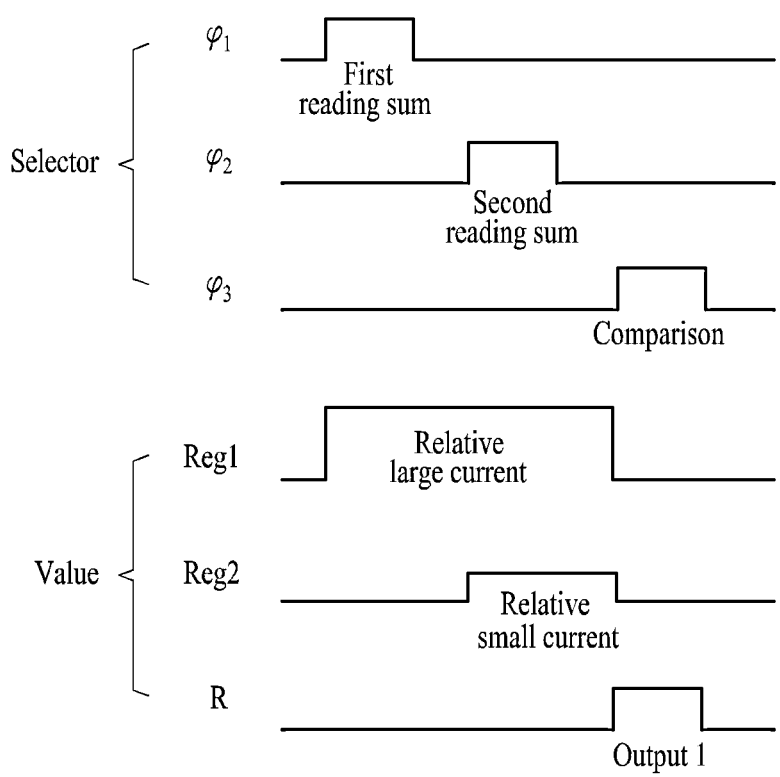

Here, an unselected wordline and an unselected bitline are connected to floating or ground, and when adding up current flowing in unselected half bitlines, remaining selected bitlines are connected to a bitline or ground. The current stored in each of registers is converted to voltage and a size comparison is performed through a comparator and then a 1-bit response of 0 or 1 is generated. FIG. 4B illustrates a timing diagram for switch signals applied in the respective steps until a challenge-response pair is formed.

Figure 4C:
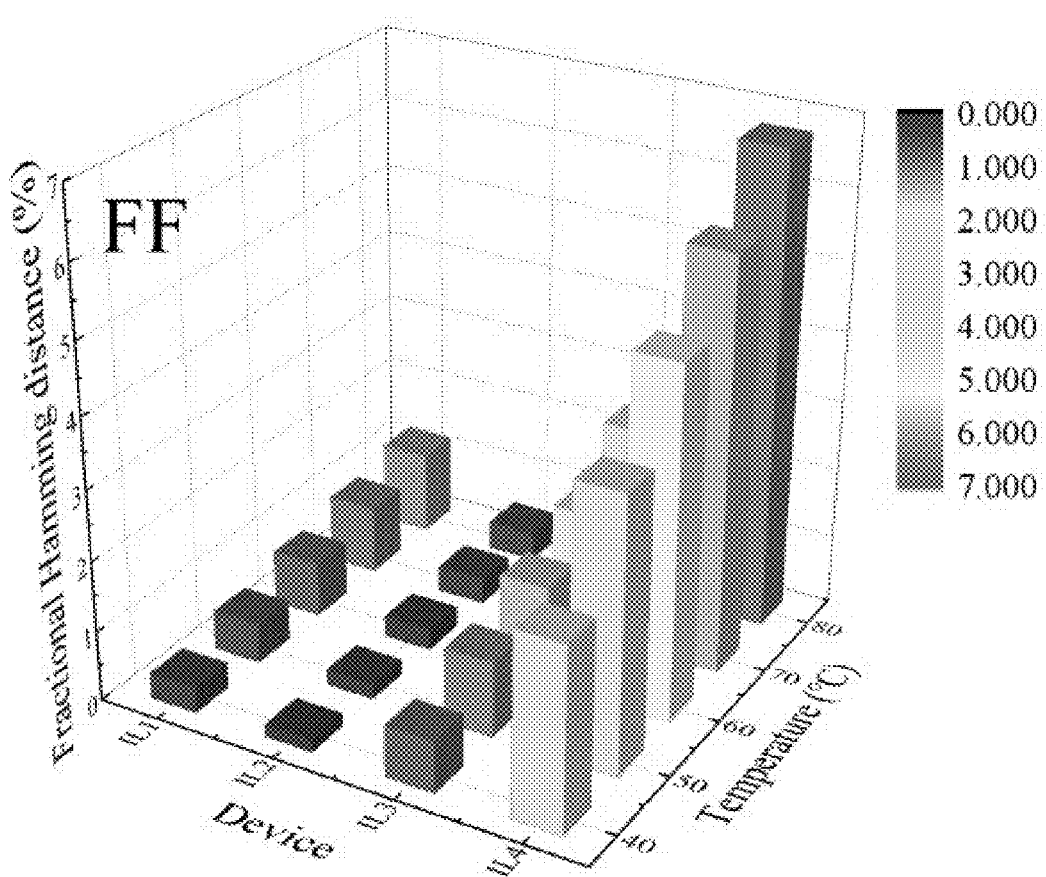
Figure 4D:
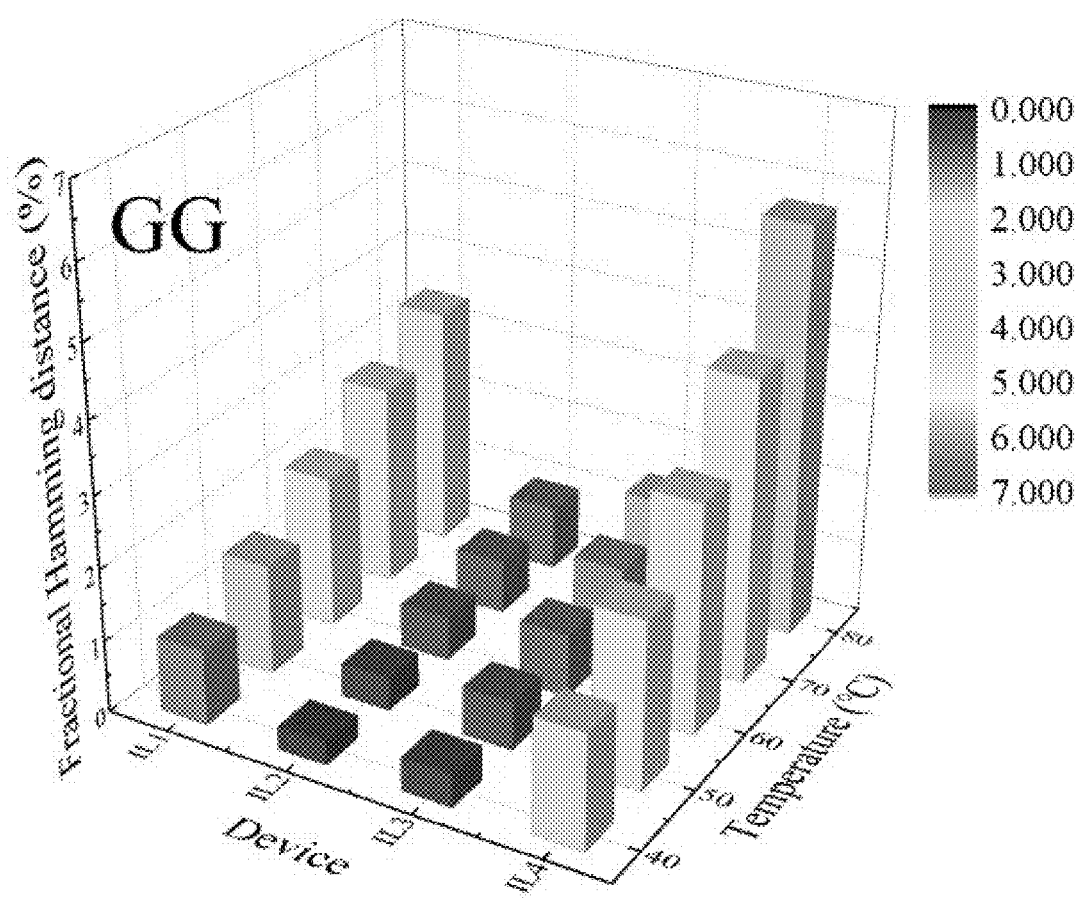

As a result of comparing Hamming distance to verify a BER by applying the above temperature-current characteristic to a memristor crossbar array-based PUF designed according to an example embodiment, it can be verified from FIGS. 4C and 4D that tunneling-based two stacks, IL2 and IL3, show relatively low BERs. In particular, in the case of an element with a lowest BER, it can be verified that a BER of less than 1% is achieved for all temperature. In general, an insulating film-based element, IL4, having a characteristic of a general memristor device shows a BER of over 5% according to an increase in temperature, indicating that a stable PUF operation is difficult.

The apparatuses described herein may be implemented using hardware components, software components, and/or a combination of the hardware components and the software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of the processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The program instructions stored in the media are specially designed and configured for the example embodiments and may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A tunneling-based memory device, comprising:
a conductive layer is stacked on a bottom electrode,
an oxide layer is stacked on the conductive layer, and
a top electrode is stacked on the oxide layer,
wherein the tunneling-based memory device has a structure of a memristor crossbar array and has a current-voltage characteristic independent of a temperature that is an external environmental variable due to a tunneling mechanism between the conductive layer and the oxide layer when constructing an unpredictable physically unclonable function (PUF) of hardware as a memory semiconductor array,
wherein a challenge to construct a PUF is applied using the tunneling-based memory device having a structure of a memristor crossbar array,
wherein the tunneling-based memory device extracts a response according to a voltage-current characteristic using the applied challenge,
wherein the tunneling-based memory device performs authentication through verification between an enrolled response and the extracted response, and
wherein the tunneling-based memory device allows current to flow in each bitline through conductivity of a memristor device and a vector and matrix multiplication operation by applying a voltage corresponding to a digital signal of the challenge to each wordline of the memristor crossbar array to form a challenge-response pair, adds up current flowing in half bitlines selected from among all bitlines, adds up current flowing in unselected half bitlines, and thereby stores the current in different registers, respectively;
wherein the tunneling-based memory device having the structure of the memristor crossbar array has the current-voltage characteristic independent of the temperature and decreases a bit-error rate (BER) that prevents an error from occurring in a security authentication process for the PUF.

2. The tunneling-based memory device of claim 1, wherein the tunneling-based memory device has a stack structure of operating with a tunneling-based conduction mechanism by adjusting a thickness of the conductive layer.

3. A physically unclonable method comprising:
applying a challenge to construct a physically unclonable function (PUF) using a tunneling-based memory device having a structure of a memristor crossbar array;
extracting a response according to a voltage-current characteristic using the applied challenge; and
performing authentication through verification between an enrolled response and the extracted response,
wherein the applying of the challenge to construct the PUF using the tunneling-based memory device having the structure of the memristor crossbar array comprises:
allowing current to flow in each bitline through conductivity of a memristor device and a vector and matrix multiplication operation by applying a voltage corresponding to a digital signal of the challenge to each wordline of the memristor crossbar array to form a challenge-response pair, adding up current flowing in half bitlines selected from among all bitlines, adding up current flowing in unselected half bit lines, and thereby storing the current in different registers, respectively;
wherein the tunneling-based memory device having the structure of the memristor crossbar array has the structure of the memristor crossbar array and has the current-voltage characteristic independent of a temperature that is an external environmental variable due to a tunneling mechanism when constructing an unpredictable PUF of hardware as a memory semiconductor array and reduces a bit-error rate (BER) that prevents an error from occurring in a security authentication process for the PUF.

4. The physically unclonable method of claim 3, wherein the extracting of the response according to the voltage-current characteristic using the applied challenge comprises connecting an unselected wordline and an unselected bitline to floating or ground, and connecting remaining selected bitlines to a bitline or ground when adding up current flowing in the unselected half bitlines, and
the current stored in each of different registers is converted to voltage and a size comparison is performed through a comparator to generate a 1-bit response of 0 or 1.

5. The physically unclonable method of claim 3, wherein the performing of the authentication through verification between the enrolled response and the extracted response comprises determining the voltage-current characteristic according to a driving principle of a memory semiconductor device and implementing a security function by using, as a unique response, a feature that a different amount of current flows regardless of the same voltage being applied due to a manufacturing process deviation and an inter-element deviation.

* * * * *